(12) United States Patent
Wagner et al.

(10) Patent No.: US 11,136,929 B2
(45) Date of Patent: Oct. 5, 2021

(54) DEVICE AND METHOD FOR CONTROLLING AN INTERNAL COMBUSTION ENGINE HAVING A CATALYTIC CONVERTER

(71) Applicant: Robert Bosch GmbH, Stuttgart (DE)

(72) Inventors: Alexandre Wagner, Stuttgart (DE); Martin Knopp, Vaihingen an der Enz (DE); Matthias Eckart, Bietigheim-Bissingen (DE); Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/963,702

(22) PCT Filed: Dec. 27, 2018

(86) PCT No.: PCT/EP2018/097008
§ 371 (c)(1),
(2) Date: Jul. 21, 2020

(87) PCT Pub. No.: WO2019/149432
PCT Pub. Date: Aug. 8, 2019

(65) Prior Publication Data
US 2021/0079861 A1 Mar. 18, 2021

(30) Foreign Application Priority Data
Jan. 30, 2018 (DE) .......................... 102018201378.0

(51) Int. Cl.
*F02D 41/02* (2006.01)
*F01N 11/00* (2006.01)
*F02D 41/14* (2006.01)

(52) U.S. Cl.
CPC ........ *F02D 41/0295* (2013.01); *F01N 11/007* (2013.01); *F02D 41/1454* (2013.01);
(Continued)

(58) Field of Classification Search
CPC combination set(s) only.
See application file for complete search history.

(56) References Cited

U.S. PATENT DOCUMENTS

| 6,336,084 B1 | 1/2002 | Omara et al. |
| 6,698,186 B2 * | 3/2004 | Ueno .................. F02D 41/1403 60/277 |

(Continued)

FOREIGN PATENT DOCUMENTS

| EP | 1052383 A2 | 11/2000 |
| JP | 2009228873 A | 10/2009 |

(Continued)

OTHER PUBLICATIONS

International Search Report for PCT/EP2018/097008, dated Apr. 12, 2019.

*Primary Examiner* — Binh Q Tran
(74) *Attorney, Agent, or Firm* — Norton Rose Fulbright US LLP; Gerard Messina

(57) ABSTRACT

A device and method for controlling an internal combustion engine having a catalytic converter. At least one actuating variable for the internal combustion engine is determined as a function of a system model of the catalytic converter and/or the internal combustion engine. The system model, a setpoint variable for the control and/or the actuating variable is adapted. Information about a modeled residual oxygen content in the exhaust gas downstream from the catalytic converter is determined using the system model. Information about an acquired residual oxygen content in the exhaust gas at the output of the catalytic converter is acquired. The information about the modeled residual oxygen content is compared with the information about the acquired residual oxygen content. A measure for an adaptation requirement is determined as a function of the result of the comparison.

15 Claims, 2 Drawing Sheets

(52) U.S. Cl.
CPC ...... *F01N 2550/02* (2013.01); *F02D 41/1441* (2013.01); *F02D 2200/0814* (2013.01)

(56) References Cited

U.S. PATENT DOCUMENTS

| | | | |
|---|---|---|---|
| 6,840,036 B2* | 1/2005 | Fiengo | F01N 13/009 60/285 |
| 9,745,910 B2* | 8/2017 | Nakamura | F02D 41/1454 |
| 9,890,723 B2* | 2/2018 | Srinivasan | F02D 41/0235 |
| 2003/0051467 A1* | 3/2003 | Lewis | F02D 41/0295 60/285 |
| 2004/0107696 A1 | 6/2004 | Harrison et al. | |
| 2005/0193996 A1 | 9/2005 | Mader et al. | |
| 2008/0087259 A1 | 4/2008 | Kato et al. | |
| 2009/0198430 A1* | 8/2009 | Yasui | F02D 41/1402 701/102 |
| 2015/0354485 A1 | 12/2015 | Santillo et al. | |

FOREIGN PATENT DOCUMENTS

| | | |
|---|---|---|
| JP | 2015510986 A | 4/2015 |
| WO | 2018091252 A1 | 5/2018 |

\* cited by examiner

DEVICE AND METHOD FOR CONTROLLING AN INTERNAL COMBUSTION ENGINE HAVING A CATALYTIC CONVERTER

FIELD

The present invention relates to a device and a method for controlling an internal combustion engine having a catalytic converter.

BACKGROUND INFORMATION

During an incomplete combustion of the air-fuel mixture in a spark ignition engine, not only nitrogen (N2), carbon dioxide (CO2) and water (H2O), but also a multitude of combustion products are expelled of which hydrocarbons (HC), carbon monoxide (CO) and nitrogen oxide (NOx) are restricted under the law. According to the current state of the art, compliance with the applicable exhaust limit values for motor vehicles can be achieved only with the aid of a catalytic exhaust aftertreatment. Using a three-way catalytic converter makes it possible to convert the mentioned pollutant components.

Three-way catalytic converters achieve a simultaneous high conversion rate for HC, CO and NOx only in a narrow range around the stoichiometric operating point $\lambda=1$, which is known as the 'catalytic converter window'. For an operation of the catalytic converter in the catalytic converter window, current engine control systems typically use a lambda control, which is based on the signals from lambda probes upstream and downstream from the catalytic converter. To control the lambda upstream from the catalytic converter, the oxygen content of the exhaust gas upstream from the catalytic converter is measured with the aid of the lambda probe. Depending on this measured value, the control corrects the fuel quantity from the pre-control. For a more precise control, the exhaust gas downstream from the catalytic converter is analyzed in addition with the aid of a further lambda probe. This signal is used for a master control which is superposed to the lambda control upstream from the catalytic converter.

Generally, a jump-type lambda probe, which has a very steep characteristic curve at $\lambda=1$ and is therefore able to indicate $\lambda=1$ very precisely, is used as the lambda probe downstream from the catalytic converter.

In addition to the master control, which generally corrects only small deviations of $\lambda=1$ and has a relatively slow configuration, current engine control systems usually have a functionality in the form of a lambda pre-control which ensures that after large deviations from $\lambda=1$ the catalytic converter window is rapidly reached again, e.g., following phases featuring a trailing throttle deactivation.

Current control concepts have the disadvantage of detecting the leaving of the catalytic converter window too late on the basis of the voltage of the jump-type lambda probe downstream from the catalytic converter.

An object of the present invention is a further improved, model-based control of a catalytic converter, which makes it possible to detect and avoid leaving of the catalytic converter window in a timely manner.

SUMMARY

The object may be achieved by an example device and example method in accordance with the present invention.

With regard to the example method according to present invention for controlling an internal combustion engine having a catalytic converter, it is provided that at least one actuating variable for the internal combustion engine is determined as a function of a system model of the catalytic converter and/or the internal combustion engine, and that an adaptation of the system model, at least one setpoint variable for the control and/or the at least one actuating variable takes place, and information about a modeled residual oxygen content in the exhaust gas downstream from the catalytic converter is determined with the aid of the system model, and information is acquired about a detected residual oxygen content in the exhaust gas at the output of the catalytic converter, the information about the modeled residual oxygen content being compared with the information about the acquired residual oxygen content in a comparison, at least one measure for an adaption requirement being determined as a function of the result of the comparison, and at least one value for the system model, the at least one setpoint variable for the control and/or the at least one actuating variable being determined as a function of at least one measure for the adaption requirement. In this way, the adaptation compensates for uncertainties of measured or modeled variables that are taken into consideration in the system model, and for model inaccuracies.

In an advantageous manner, a deviation of the information about the modeled residual oxygen content is determined using the information about the acquired residual oxygen, and at least one measure for the adaptation requirement is determined only if the deviation exceeds a threshold value. If these two signals do not differ significantly, then no or no further adaptation requirement exists. However, if a significant deviation occurs between these two signals, then this points to uncertainties of the lambda signal upstream from the catalytic converter or to inaccuracies of the model itself, which require compensation.

A first measure for the adaptation requirement is advantageously determined as a function of a difference of the information about the residual oxygen contents, the difference being integrate using a first time constant.

A first measure for the adaptation requirement is advantageously determined as a function of a difference of the information about the residual oxygen contents, a first proportionally and integrally acting controller controlling the first measure as a function of the difference using a first time constant. A PI controller rather than an integrator is thus employed.

In an advantageous manner, a second measure for the adaptation requirement is determined as a function of the difference, the difference being integrated using a second time constant that is smaller than the first time constant. A second measure for the adaptation requirement is advantageously determined as a function of the difference, and a second proportionally and integrally acting controller controls the second measure as a function of the difference using a second time constant that is smaller than the first time constant.

Integrators or controllers acting in a proportional and integral fashion and having different dynamics are used to determine the measure for the adaptation requirement. Uncertainties that remain approximately constant over a longer period of time are thereby slowly adapted using the first time constant, whereas modeling inaccuracies that occur only temporarily are compensated for in a rapid manner using the second time constant. An adaptation of the lambda signal upstream from the catalytic converter, for instance, may occur relatively slowly because a possibly existing offset of the lambda probe upstream from the catalytic converter normally changes only slowly over the service life of the probe. Inaccuracies of the system model, on the other hand, may have effects of different magnitudes depending on the driving conditions and require a relatively fast compensation.

In an advantageous manner, a third measure for the adaptation requirement is determined as a sum or a weighted sum of the first measure and the second measure. For some uncertainties, it is useful to correct using both integrators or PI controllers. In this case, it is provided to sum the output signals of the two integrators and to possibly weight them in advance.

In an advantageous manner, a condition for a start and/or an end of a determination of the first measure and/or the second measure is monitored, and the determination is started and/or ended as a function of the condition. The on and/or off conditions for learning a measure for the adaptation requirement are not necessarily the same as those for the activation and/or deactivation of the adaptation itself. In this case the learning of the two integrators or PI controllers takes place as a function of suitable on and/or off conditions.

The first measure is advantageously determined only during steady-state operating conditions. A steady-state operating state of the catalytic converter is therefore detected before the learning begins.

In an advantageous manner, the first measure is stored at the end of a driving cycle, and/or the second measure is stored at the end of a driving cycle, and the stored first measure is used as the starting value for the first measure at the start of a following driving cycle, and/or the stored second measure is used as the starting value for the second measure. They are initialized with the stored value. This avoids the need for learning the adaptation requirement anew in each driving cycle.

In an advantageous manner, the first measure is output to at least one other function in an engine control system. As a result, for example, the function of a diagnosis for an offset of the lambda probe upstream from the catalytic converter or the function of a lambda control for a correction of the setpoint lambda is able to be improved.

Additional advantageous embodiments result from the description below and the figures.

DETAILED DESCRIPTION OF EXAMPLE EMBODIMENTS

Below, the present invention is described using the example of a three-way catalytic converter, but it is correspondingly also transferrable to other types of catalytic converters.

Figure 1:
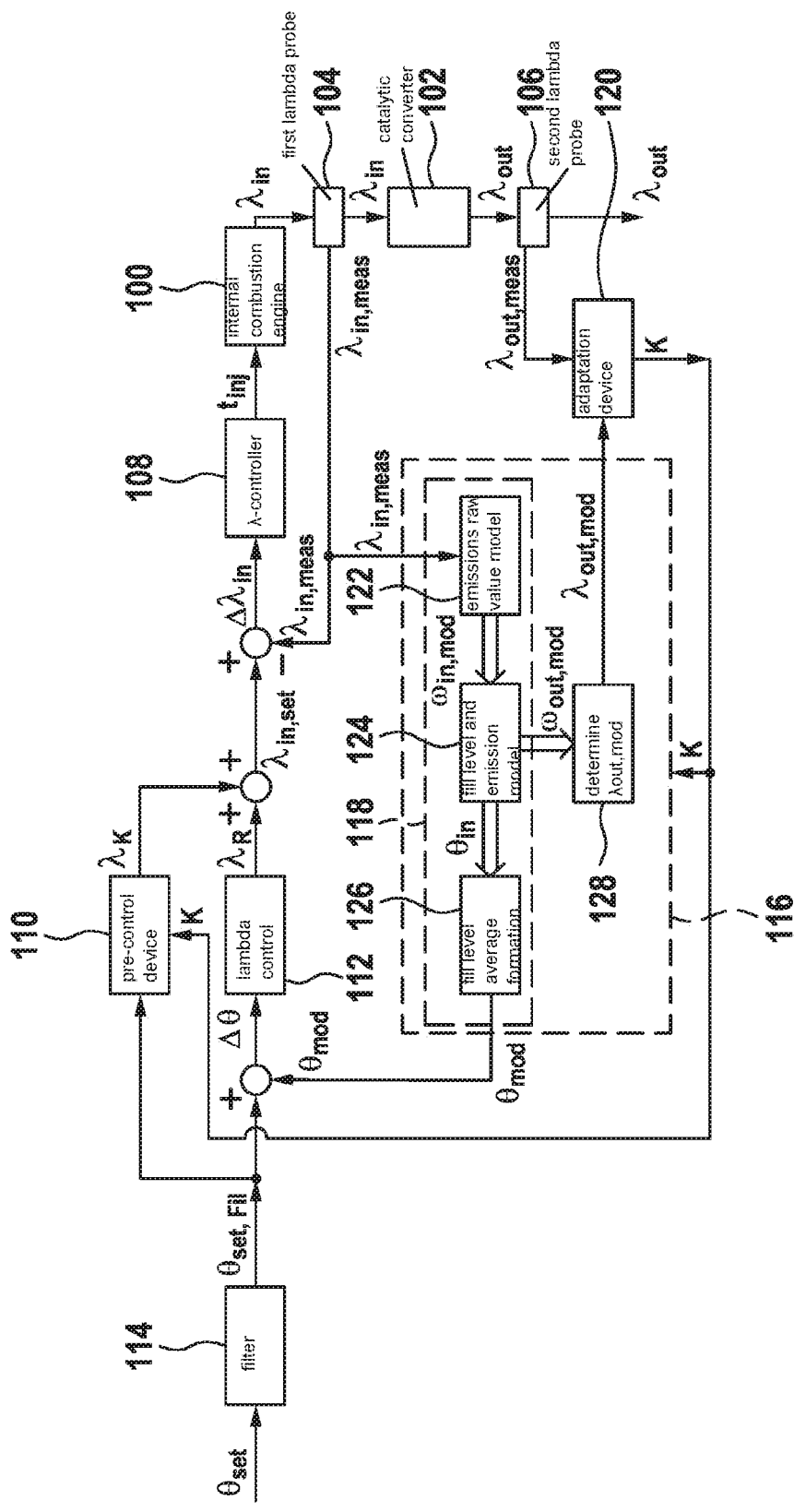
FIG. 1 show schematically, parts of a control for an internal combustion engine in accordance with an example embodiment of the present invention.

FIG. 1 schematically shows parts of a control for an internal combustion engine 100 having a catalytic converter 102, in accordance with an example embodiment of the present invention.

Exhaust gas emerging from internal combustion engine 100 enters catalytic converter 102 with a residual oxygen content $\lambda$in. The exhaust gas emerges at the output of catalytic converter 102 with a residual oxygen content $\lambda$out.

A first lambda sensor 104 acquires residual oxygen content $\lambda$in and outputs information about an acquired residual oxygen content $\lambda$in,meas upstream from catalytic converter 102.

A second lambda sensor 106 acquires residual oxygen content $\lambda$out and outputs information about an acquired residual oxygen content $\lambda$out,meas downstream from catalytic converter 102.

In the example, internal combustion engine 100 is actuated for the control using injection times tinj. Other variables may be provided, e.g., for the actuation of a throttle valve or for the actuation of valves of internal combustion engine 100. These are not shown in FIG. 1 for the sake of clarity.

A $\lambda$-controller 108 specifies injection times tinj for an injection system integrated into internal combustion engine 100. $\lambda$-controller 108 determines injection times tinj as a function of a control deviation $\Delta\lambda$in, which is formed on the basis of the information about the acquired residual oxygen content $\lambda$in and a lambda setpoint value $\lambda$in,Set.

In the example, lambda setpoint value $\lambda$in,Set is determined as the sum of a lambda pre-control setpoint value $\lambda$V and a lambda controller setpoint value $\lambda$R.

A pre-control device 110 determines lambda pre-control setpoint value $\lambda$V as a function of a filtered average fill level $\theta$Set,Fil. A fill level controller 112 determines lambda controller setpoint value $\lambda$R as a function of a control deviation $\Delta\theta$ between filtered average fill level setpoint value $\theta$Set,Fil and an average modeled fill level $\theta$mod.

In the example, a fill level setpoint value $\theta$Set is predefined and filtered in order to determine the filtered average fill level setpoint value $\theta$Set,Fil with the aid of a filter 114.

At least one actuating variable for internal combustion engine 100 is determined as a function of a system model 116. In the example, average modeled fill level $\theta$mod is determined by system model 116.

System model 116 includes a model 118 of the three-way catalytic converter, i.e., catalytic converter 102.

An adaptation device 120, for example, is developed for the adaptation of system model 116 and/or model 118. Adaptation device 120 is alternatively or additionally developed for the adaptation of at least one of the setpoint variables for the control of internal combustion engine 100 and/or for the adaptation of at least one of the actuating variables.

For instance, the average fill level setpoint value $\theta$Set or the average filtered fill level setpoint value $\theta$Set,Fil is able to be adapted as the setpoint variable. As the actuating variable, lambda setpoint value $\lambda$in,set, lambda pre-control setpoint value $\lambda$V or lambda controller setpoint value $\lambda$R is able to be adapted.

In the example, adaptation device 120 determines a measure for an adaptation requirement k, and system model 116 and pre-control 110, e.g., lambda pre-control setpoint value $\lambda$V, are adapted.

With the aid of system model 116, information about a modeled residual oxygen content $\lambda$out,mod in the exhaust gas downstream from catalytic converter 102 is determined.

An input variable of system model 116 is residual oxygen content $\lambda$in,meas, determined by first lambda probe 104, of the exhaust gas at the input of catalytic converter 102. Using an emissions raw value model 122, a modeled concentration $\omega$in,mod upstream from catalytic converter 102 is determined as a function thereof.

Depending on modeled concentration $\omega$in,mod upstream from catalytic converter 102, a modeled concentration $\omega$out, mod downstream from catalytic converter 102 is determined with the aid of a fill level and emission model 124. Depending on modeled concentration $\omega$in,mod upstream from catalytic converter 102, modeled fill levels of all zones $\theta$m of catalytic converter 102 are determined with the aid of fill level and emission model 124.

Depending on modeled fill levels $\theta$m of all zones of catalytic converter 102, average modeled fill level $\theta$mod is determined with the aid of fill level average formation 126.

Depending on modeled concentration $\omega$out,mod downstream from catalytic converter 102, modeled residual oxygen content $\lambda$out,mod in the exhaust gas downstream from catalytic converter 102 is determined for a $\lambda$ output value 128 with the aid of a model. Depending on the information about modeled residual oxygen content $\lambda$out,mod and the information about acquired residual oxygen content $\lambda$out, meas, at least one measure k is determined for an adaptation requirement.

Depending on at least one measure k for the adaptation requirement, at least one value for system model 118, the at least one setpoint variable for the control, and/or the at least one actuating variable is/are determined.

Since the input variables of the system model 116 may include uncertainties and since system model 116 itself may also be inaccurate, e.g., because of not taking certain effects into account, system model 116 is adapted in the example. It is advantageous also to adapt pre-control 110 and possibly control parameters of controller 112.

Hereinafter, an uncertainty of the lambda signal upstream from catalytic converter 102 is assumed by way of example, that is to say, the information about acquired residual oxygen content $\lambda$in,meas upstream from catalytic converter 102.

Figure 2:
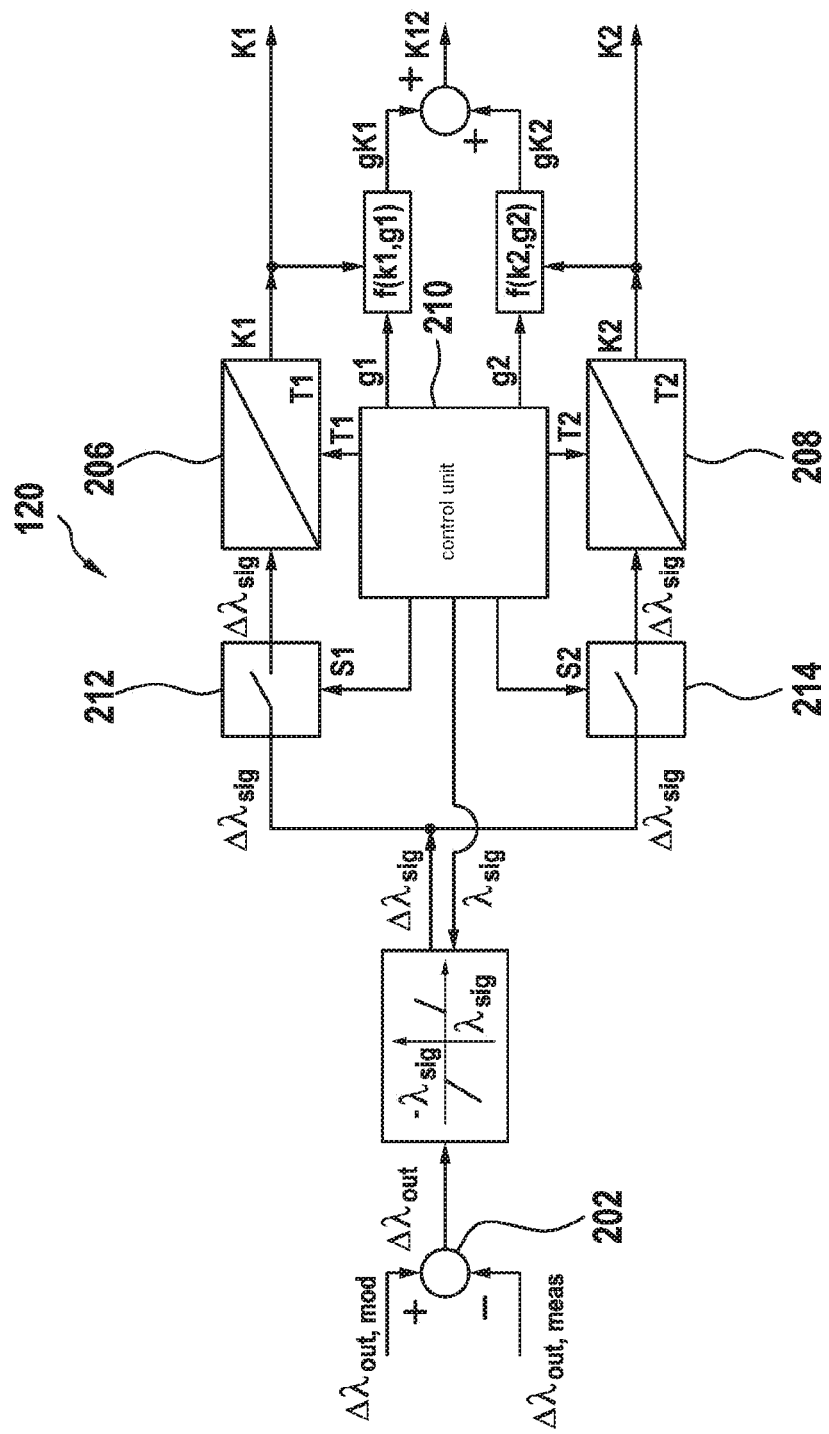
FIG. 2 show schematically, parts of an adaptation in accordance with an example embodiment of the present invention.

Based on FIG. 2, an exemplary development of adaptation device 120 in accordance with an example embodiment of the present invention is described below.

Adaptation device 120 includes a comparator device 202, which is designed to compare the information about modeled residual oxygen content $\lambda$out,mod with the information about acquired residual oxygen content $\lambda$out,meas in a comparison. In the example, a difference $\Delta\lambda$out is formed between the information about modeled residual oxygen content $\lambda$out,mod and the information about acquired residual oxygen content $\lambda$out,meas.

It is optionally checked in a threshold value device 204 whether difference $\Delta\lambda$out exceeds a threshold value $\lambda$sig. In the example it is checked whether $\lambda$sig<$\Delta\lambda$out<$\lambda$sig. For negative values of the difference $\Delta\lambda$out, for example, the negative sign is ignored. If difference $\Delta\lambda$out exceeds threshold value $\lambda$sig, then a significant difference is present in the information about residual oxygen contents $\Delta\lambda$sig. It is otherwise zero in the example. This means that the measure for the adaptation requirement is determined only if a deviation of the residual oxygen contents is significant. If a significant deviation occurs between these two signals, then this points to uncertainties of the lambda signal upstream from the catalytic converter or to inaccuracies of the model itself, which have to be compensated.

In the example, adaptation device 120 is developed to determine at least one measure for the adaptation requirement as a function of the result of the comparison. In the example, adaptation device 120 is developed to determine a first measure k1, a second measure k2 and a third measure k12. It may also be provided to determine only one of the measures.

Uncertainties that are approximately constant over a longer period of time should be adapted slowly with the aid of the measures described in the following text, whereas model inaccuracies that occur only temporarily are compensated in a rapid manner. An adaptation of the lambda signal upstream from catalytic converter 102, i.e., the information about acquired residual oxygen content $\lambda$in,meas, for instance, may be performed relatively slowly because a possibly existing offset of first lambda probe 104 usually changes only slowly over the service life of lambda probe 104. Inaccuracies of system model 118, on the other hand, may have effects of different magnitudes as a function of driving conditions of a vehicle driven by internal combustion engine 100 and require a relatively fast compensation.

This differentiation is realized by at least two sub-functionalities, which learn at different speeds and exhibit an integral behavior, the sub-functionalities being fed by the difference from the modeled and the measured lambda signal downstream from catalytic converter 102, i.e., difference $\Delta\lambda$sig, information about the acquired residual oxygen content $\lambda$out,meas and the information about modeled residual oxygen content $\lambda$out,mod.

The difference of the information about residual oxygen contents $\Delta\lambda$sig is integrated in a first integrator 206 using a first time constant T1, for example. First measure k1 in the example is the result of the integration using first integrator 206.

The difference of the information about residual oxygen contents $\Delta\lambda$sig is integrated in a second integrator 208 using a second time constant T2, for example. Second measure k2 in the example is the result of the integration using second integrator 208.

Instead of first integrator 206, a first proportionally and integrally acting controller is also able to control first measure k1 as a function of difference $\Delta\lambda$sig using first time constant T1.

Instead of second integrator 208, a second proportionally and integrally acting controller is also able to control second measure k2 as a function of difference $\Delta\lambda$sig using second time constant T2.

In the example, second time constant T2 is smaller than first time constant T1. It is therefore provided that first integrator 206 learns only relatively slowly. This slow integrator, for instance, is used for adapting uncertainties of the lambda signal upstream from catalytic converter 102, i.e., the information about acquired residual oxygen content $\lambda$in,meas. In addition, it is provided that second integrator 208 learns relatively quickly. This fast integrator is used for the compensation of model inaccuracies. The output signals of the integrators represent the measure for the adaptation or compensation requirement in each case.

For example, it is provided to correct at least one input signal of system model 116 in accordance with this requirement. It is meaningful, for instance, to correct the information about acquired residual oxygen content $\lambda$in,meas when the adaptation requirement points to an offset of first lambda probe 104 upstream from catalytic converter 102.

It is furthermore useful, for example, to adapt the modeled average fill level $\theta$mod of system model 116 or average fill level setpoint value $\theta$Set of fill level control 112 if the compensation requirement points to an inaccuracy of system model 116. However, a correction of acquired residual oxygen content $\lambda$in,meas, which is entered into system model 116, would alternatively be possible as well in this case.

It may be useful to correct one and the same signal with the aid of both integrators. Third measure k12 for the adaptation requirement is able to be determined as the sum of first measure k1 and second measure k2 or, as in the example, as the sum of the first measure k1 and second measure k2 weighted by weights gk1 for first measure k1 and gk2 for second measure k2. The weighting in the example is implemented as function of operating conditions and may thus change dynamically. It may also be provided to consider one or both integrators at 0%. For this purpose, the weights are optionally determined as a function of the on and/or off conditions. It can also be provided to consider one of the integrators at 100% and the other at 0%. This corresponds to a switchover between the integrator outputs.

In the example, threshold value λsig, weights gk1, gk2 as well as time constants T1, T2 are specified by a control unit 210.

Control unit 210 is also able to monitor a condition for a start and/or an end of a determination of the first measure and/or the second measure. In this case, the determination is started and/or ended as a function of the condition. Toward this end, a first switching device 212 is optionally placed between threshold value device 204 and first integrator 206, which is able to start and end the determination of second measure k2 from difference Δλsig as a function of a first switching signal s1. A second switching device 214 is optionally placed between threshold value device 204 and first integrator 206 for this purpose, which is able to start and end the determination of second measure k2 from difference Δλsig as a function of a second switching signal s2.

The learning of the two integrators is made dependent upon suitable switch-on conditions. In particular, it may be provided to use different switch-on conditions for the two integrators.

For example, it is advantageous to let the slow integrator learn only when steady-state conditions have already been present for a predefined time so that it may be assumed that catalytic converter 102 is in a settled-in state and residual oxygen content λin at the input of catalytic converter 102 comes about as residual oxygen content λout at the output of catalytic converter 102. For this purpose, for example, it is optionally provided that first measure k1 is determined only during steady-state operating conditions.

On the other hand, it is advantageous to let the fast integrator learn under less restrictive conditions in order to allow for a fast compensation of model inaccuracies such as whenever a stoichiometric mixture is requested.

In addition, it may be provided that both integrators learn only when the signal from second lambda probe 106 downstream from catalytic converter 102 is reliable, that is to say, only when this probe is in an operative state, for example.

At the end of a driving cycle of the motor vehicle driven by internal combustion engine 100, first measure k1 may optionally be stored. At the start of the next driving cycle, stored first measure k1 is able to be used as a starting value for first measure k1 in such a case. At the end of the driving cycle, second measure k2 is also able to be stored. At the start of the subsequent driving cycle, stored second measure k2 is able to be used as a starting value for second measure k2 in such a case. At the start of the next driving cycle, an initialization with the aid of the stored value then takes place.

It may also be provided that the first measure is output to at least one other function in an engine control system. For instance, the content of the slow integrator is made available to other functions in an engine control system, e.g., to a diagnosis for the offset of first lambda probe 104 upstream from catalytic converter 102 or lambda control 112 for a correction of lambda controller setpoint value λR.

What is claimed is:

1. A method for controlling an internal combustion engine having a catalytic converter, the method comprising the following steps:
   determining at least one actuating variable for the internal combustion engine as a function of a system model of: the catalytic converter and/or the internal combustion engine;
   adapting the system model, and/or at least one setpoint variable for the controlling and/or the at least one actuating variable;
   determining information about a modeled residual oxygen content in exhaust gas downstream from the catalytic converter, using the system model;
   acquiring information about an acquired residual oxygen content in exhaust gas at an output of the catalytic converter;
   comparing the information about the modeled residual oxygen content with the information about the acquired residual oxygen content;
   determining at least one measure for an adaptation requirement as a function of a result of the comparison; and
   determining at least one value for: the system model, and/or the at least one setpoint variable for the controlling, and/or the at least one actuating variable, as a function of at least one measure for the adaptation requirement.

2. The method as recited in claim 1, wherein a deviation of the information about the modeled residual oxygen content is determined using the information about the acquired residual oxygen content, and at least one of the at least one measure for the adaptation requirement is determined only when the deviation exceeds a threshold value.

3. The method as recited in claim 1, wherein a first measure of the at least one measure for the adaptation requirement is determined as a function of a difference between the information about the modeled residual oxygen content and the information about the acquired residual oxygen content, the difference being integrated using a first time constant.

4. The method as recited in claim 1, wherein a first measure of the at least one measure for the adaptation requirement is determined as a function of a difference between the information about the modeled residual oxygen content and the information about the acquired residual oxygen content, and a first proportionally and integrally acting controller controls the first measure as a function of the difference using a first time constant.

5. The method as recited in claim 3, wherein a second measure of the at least one measure for the adaptation requirement is determined as a function of the difference, and the difference is integrated using a second time constant which is smaller than the first time constant.

6. The method as recited in claim 3, wherein a second measure of the at least one measure for the adaptation requirement is determined as a function of the difference, and a second proportionally and integrally acting controller controls the second measure as a function of the difference using a second time constant which is smaller than the first time constant.

7. The method as recited in claim 5, wherein a third measure of the at least one measure for the adaptation requirement is determined as a sum or a weighted sum of the first measure and the second measure.

8. The method as recited in claim 5 wherein a condition for a start and/or an end of a determination of the first measure and/or the second measure is monitored, and the determination is started and/or ended as a function of the condition.

9. The method as recited in claim 8, wherein the first measure is determined only during steady-state operating conditions.

10. The method as recited in claim 5, wherein the first measure is stored at an end of a driving cycle, and/or the second measure is stored at the end of a driving cycle, and at a beginning of a following driving cycle, the stored first measure is used as a starting value for the first measure, and/or the stored second measure is used as a starting value for the second measure.

11. The method as recited in claim 3, wherein the first measure is output to at least one other function in an engine control system.

12. A device for controlling an internal combustion engine, the device configured to:
   determine at least one actuating variable for the internal combustion engine as a function of a system model of: (i) the catalytic converter, and/or (ii) the internal combustion engine;
   adapt the system model, and/or at least one setpoint variable for the controlling, and/or the at least one actuating variable; and
   determine information about a modeled residual oxygen content in exhaust gas downstream from the catalytic converter using the system model;
   acquire information about an acquired residual oxygen content in exhaust gas at an output of the catalytic converter;
   compare the information about the modeled residual oxygen content with the information about the acquired residual oxygen content using a comparator device;
   determine at least one measure for an adaptation requirement as a function of a result of the comparison;
   determine at least one value for the system model, and/or the at least one setpoint variable for the control, and/or the at least one actuating variable, as a function of at least one measure for the adaptation requirement.

13. The device as recited in claim 12, wherein the adaptation device is configured to determine a deviation of the information about the modeled residual oxygen content using the information about the acquired residual oxygen content, and at least one of the at least one measure for the adaptation requirement is determined only when the deviation exceeds a threshold value.

14. The device as recited in claim 12, wherein the device is configured to determine a first measure of the at least one measure for the adaptation requirement as a function of a difference between the information about the modeled residual oxygen content and the information about the acquired residual oxygen content, the difference being integrated using a first time constant.

15. The device as recited in claim 12, wherein the device is configured to determine a first measure of the at least one measure for the adaptation requirement as a function of a difference between the information about the modeled residual oxygen content and the information about the acquired residual oxygen content, and a first proportionally and integrally acting controller controls the first measure as a function of the difference using a first time constant.

* * * * *